(12) United States Patent
Gasbarro

(10) Patent No.: US 7,662,032 B1
(45) Date of Patent: Feb. 16, 2010

(54) PORTION CUTTER

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 12/465,122

(22) Filed: May 13, 2009

(51) Int. Cl.
*A22C 18/00* (2006.01)
(52) U.S. Cl. ..................................... 452/155
(58) Field of Classification Search ......... 452/149–153, 452/155, 156, 163, 165, 177, 179, 170
See application file for complete search history.

(56) References Cited

U.S. PATENT DOCUMENTS

| | | | | | |
|---|---|---|---|---|---|
| 1,807,448 | A | * | 5/1931 | Soderberg | 452/149 |
| 1,992,714 | A | * | 2/1935 | Nelson | 83/407 |
| 2,431,465 | A | * | 11/1947 | Christiansen | 452/149 |
| 3,570,050 | A | * | 3/1971 | Draper et al | 452/149 |
| 4,476,610 | A | * | 10/1984 | Wenzel | 452/170 |
| 4,800,626 | A | * | 1/1989 | Wastell | 452/110 |
| 4,837,895 | A | * | 6/1989 | Emsens | 99/419 |
| 5,358,441 | A | * | 10/1994 | Hjorth | 452/180 |
| 7,364,504 | B2 | * | 4/2008 | Gasbarro | 452/156 |

* cited by examiner

*Primary Examiner*—Thomas Price
(74) *Attorney, Agent, or Firm*—Jason H. Foster; Kremblas, Foster, Phillips & Pollick

(57) ABSTRACT

An apparatus for producing selectively sized multiple portions of meat from a larger piece of meat. A plurality of product carriers having open-top recesses are mounted on a conveyor for travel along a path. At least two transverse sets of parallel slots are provided in each carrier. Each product carrier is moved through a pair of cutting stations having a number of spaced knife edges extending downwardly into a passage that receive the product carriers. The blades are removably mounted to removable knife blocks. The product carrier is rotated via engagement between a rotation gear on the carrier and a rotation bracket along the path of travel. In this manner, a plurality of laterally spaced cuts are made in two directions through the larger piece of meat to produce a multiplicity of smaller portions having a similar size, shape and weight.

6 Claims, 9 Drawing Sheets

PORTION CUTTER

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The present invention relates generally to food processing equipment and particularly to an improved apparatus for making a plurality of selectively sized portions from a larger piece of meat.

2. Description of the Related Art

The food industry has, for many years, relied upon making several smaller pieces or portions from a larger piece of meat. Typically, this process was performed by manual cutting of the larger portion into smaller pieces. This process was very labor intensive and lacked a level of consistency in the size, shape, and weight of the smaller portions produced. In the food service or restaurant business, selective consistently sized portions have become very popular. This is particularly true as applied to poultry breast or beef products wherein smaller chunks or cube-like pieces are prepared from a larger cut of meat and a selective number of such pieces produced are sold in single servings. In view of this practice, it is highly desirable to make each piece as consistent in size and weight as possible. This creates a better customer image and provides a higher degree of control of costs relative to the weight of product sold.

Many prior attempts have been made to create an automated machine to perform the cutting and sizing functions described above. Some of these attempts have been improvements over the manual cutting process. For example, U.S. Pat. No. 7,364,504 to Gasbarro discloses a portion cutting apparatus that performs particularly well. However, the means incorporated by that apparatus for rotating the piece of meat being processed is known to introduce a level of inconsistency of performance. Additionally, the cutting stations of that apparatus incorporate fastening means that must be removed in a time-consuming manner to perform routine maintenance on components of the stations.

It would therefore be desirable to have a portion cutting apparatus that employs an effective, reliable means for rotating a piece of meat that is being processed. It would further be desirable to have such an apparatus that incorporates cutting stations that can be easily disassembled for maintenance.

BRIEF SUMMARY OF THE INVENTION

The present invention relates to an automated portion control apparatus for cutting a larger piece of meat into discrete, consistently sized portions.

In accordance with the preferred embodiment of the present invention, multiple carrier blocks are mounted on a conveyor for travel along a selected path. Each block includes a recess having a shape selected to most efficiently receive the larger pieces of meat that are to be cut into pieces of a selected size and weight.

Multiple slots are provided in each carrier block that extend through the upper surface of the block to a depth at least equal to the bottom surface of the recess. The slots are arranged in a predetermined pattern wherein a first set of slots extends in a direction parallel to the intended path of travel and a second set of slots extends across the first set at a selected angle thereto. Usually, the angle is approximately ninety degrees if one chooses to create smaller sized portions having a generally rectangular or cube-like shape.

The carrier blocks are mounted on the conveyor for selected pivotal movement at a point along their path of travel to align one set of the slots parallel to the path of travel prior to encountering a plurality of knife blades fixed at one of a pair of cutting stations in spaced relationship along the path of travel. Specifically, it is a critical feature of the invention that a rotation gear is mounted to the bottom of each carrier block and has a plurality of gear teeth for cooperatively engaging pivot teeth that extend from a rotation bracket mounted at a fixed position between the cutting stations. The engagement between the gear teeth and the pivot teeth causes the carrier block to selectively pivot between a first rotated position and a second rotated position for moving the second set of slots in the carrier block into parallel alignment with the path of travel before passing through the second cutting station. Preferably, a second rotation bracket is provided after the second cutting station for rotating the carrier block back to its first rotated position, or at least to place the first set of slots parallel to the path of travel before passing back through the first cutting station.

Each cutting station includes a knife block that is removably mounted to a pair of laterally opposing side panels. Each knife block includes a knife cartridge removably mounted to a cartridge holder. The knife blades are removably mounted to the knife cartridge and are laterally spaced from one another across the path of travel of the carrier blocks and aligned to enter the set of slots which are aligned parallel thereto to engage and cut the meat product carried in the recess. The number of knife blades employed and the angular relationship between the two sets of slots and their spacing determine the size and shape of the final portions of the original larger meat product.

It is another feature of the invention that the knife blocks have mounting posts extending laterally therefrom for slidably fitting into vertical J-channels formed in the side panels of the cutting stations. The engagement between the mounting posts and the J-channels holds the knife blocks securely in place during operation while allowing the blocks to be removed easily from the cutting stations for convenient maintenance.

It is therefore an object of the present invention to provide an efficient, high volume, automated meat processing apparatus which produces selectively cut portions of meat and that employs an effective means for reliably rotating pieces of meat that are being processed.

It is another object of the present invention to provide an apparatus of the type described that incorporates cutting stations that can be disassembled easily for maintenance.

Figure 1:
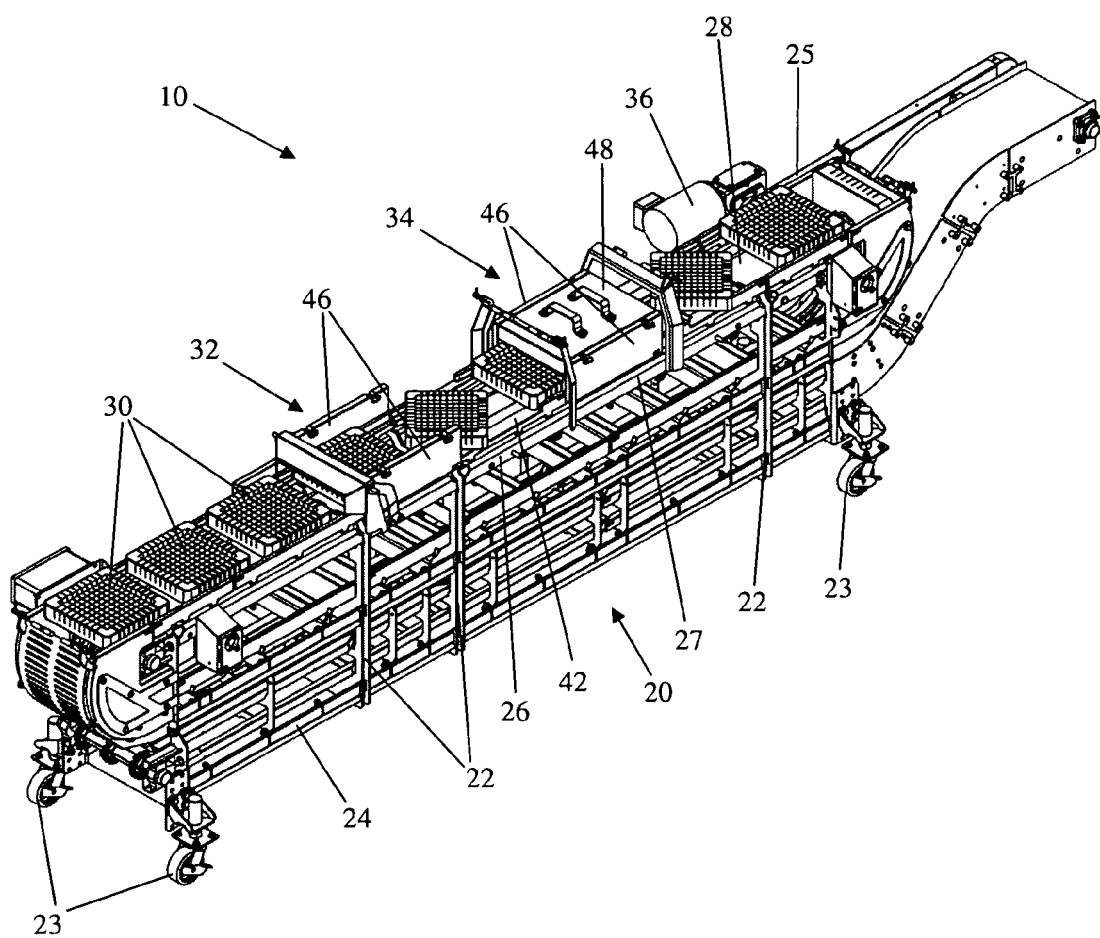
FIG. 1 is a perspective view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word "connected" or terms similar thereto are often used. They are not limited to direct connection, but include connection through other elements where such connection is recognized as being equivalent by those skilled in the art.

DETAILED DESCRIPTION OF THE INVENTION

Referring to FIG. 1, a meat cutting apparatus 10 in accordance with the present invention is illustrated. The apparatus 10 is for producing a plurality of pieces of meat of a selected size and weight from a larger piece of meat. The apparatus includes a support frame 20 having legs 22, horizontal support members 24 and an upper support surface 26 mounted to the legs 22. The legs 22 may include wheels 23 to permit convenient movement of the frame 20 as a whole unit.

The upper support surface 26 forms a deck-like structure having a longitudinally extending central opening that exposes the upper run of an endless, chain-type conveyor 28. The conveyor 28 is mounted on a pair of sprockets in a conventional manner as will be understood by those skilled in the art. The conveyor 28 supports a plurality of product carrier blocks 30 that are mounted to the chain conveyor 28 in a longitudinally spaced relationship along the selected path of travel of the blocks 30.

The support frame 22, the upper support surface 26 and the conveyor 28 are of conventional form and may be constructed in any conventional, well-known manner to support any form of conventional conveying means deemed suitable for the purpose of the present invention by one of ordinary skill. The frame 20, upper support surface 26 and conveyor 28 may consist of many conventional designs that are suitable to function according to the present invention. Therefore, the frame 20, upper support surface 26 and conveyor 28 will only be briefly described herein to the extent necessary for enabling one of ordinary skill to understand, make and use the present invention.

The upper support surface 26 comprises opposing L-shaped beams 25 and 27 that are fixed to the legs 22. The L-shaped beams 25 and 27 support a pair of cutting stations, indicated generally at 32 and 34, fixed in longitudinally spaced relationship to one another along the path of travel defined by the chain conveyor 28. A conventional electric motor and gear box assembly 36, and a drive shaft and idler shaft (not within view), are provided to drive the chain conveyor 28 in a conventional manner.

Figure 5:
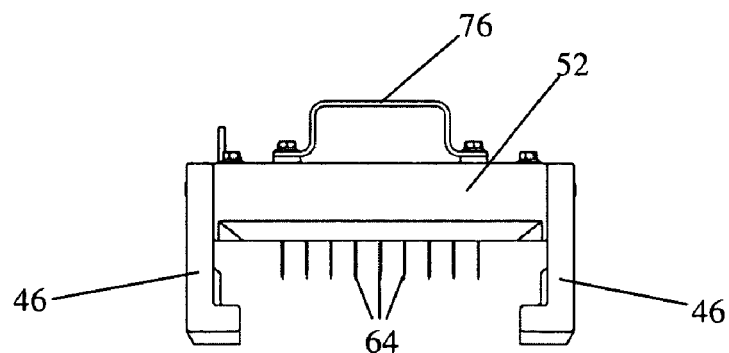
FIG. 5 is a rear detail view illustrating the cutting station of the preferred embodiment of the present invention shown in FIGS. 3 and 4.

A guide rail 42, along which carrier blocks 30 move, may be fixed in any conventional manner to the upper support surface 26. Each cutting station 32 and 34 may be removably fixed to the upper support surface 26 by a threaded pin extending into a complimentary hole (not within view) in L-shaped beams 25 and 27. Preferably, the cutting stations 32 and 34 are constructed to be easily disassembled for cleaning or for replacement to modify the number or spacing of knife blades desired. In the preferred embodiment shown in FIGS. 1 and 5, each of the cutting stations 32 and 34 includes a pair of opposing side panels 46 mounted to a respective one of the beams 25 or 27, as noted above, and a knife block indicated generally at 48 (the knife block of the cutting station 32 is shown removed in FIG. 1, but is substantially identical to the knife block of the cutting station 34).

Figure 2:
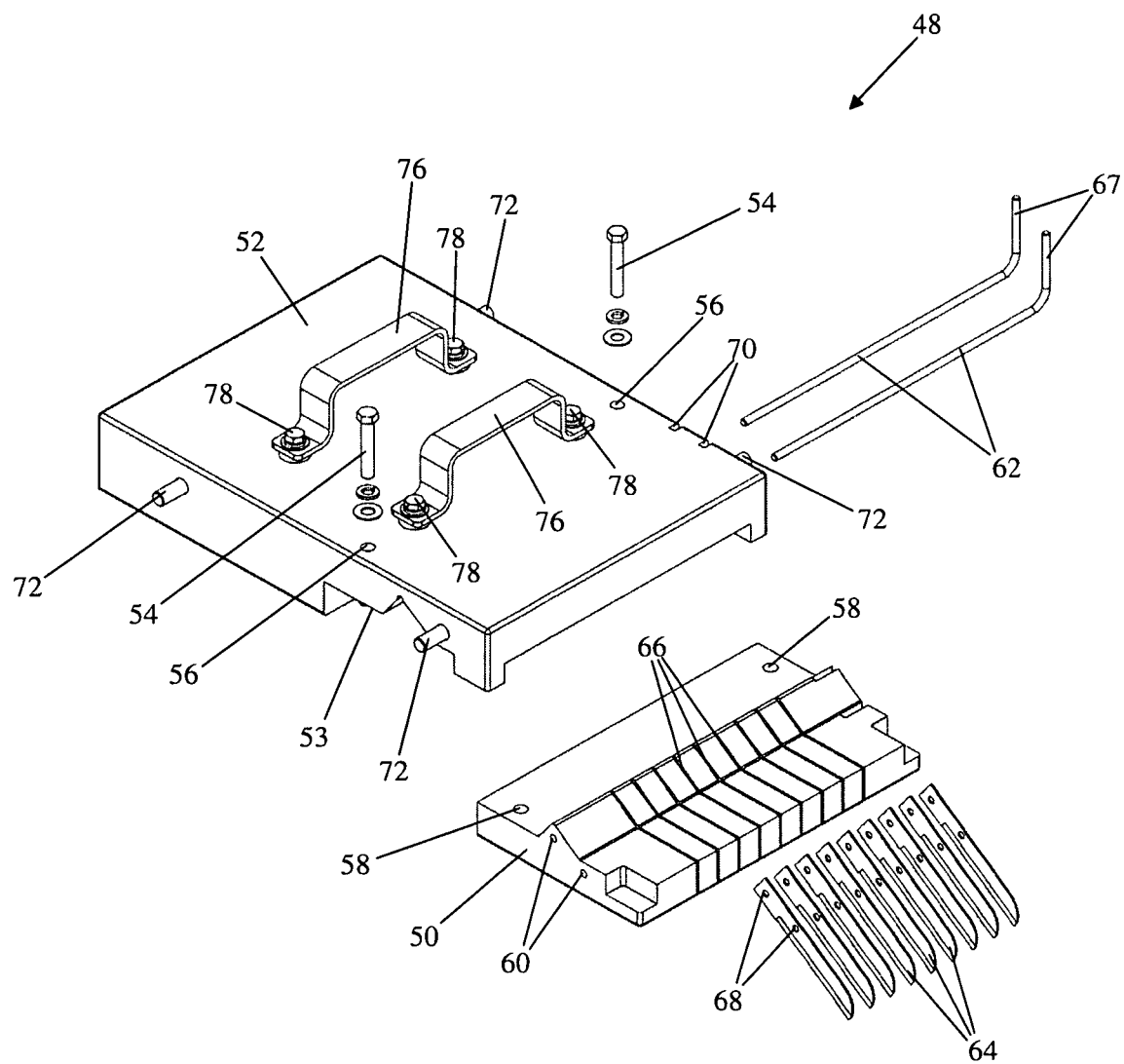
FIG. 2 is an exploded view in perspective illustrating a knife block of the preferred embodiment of the present invention shown in FIG. 1.
Figure 3:
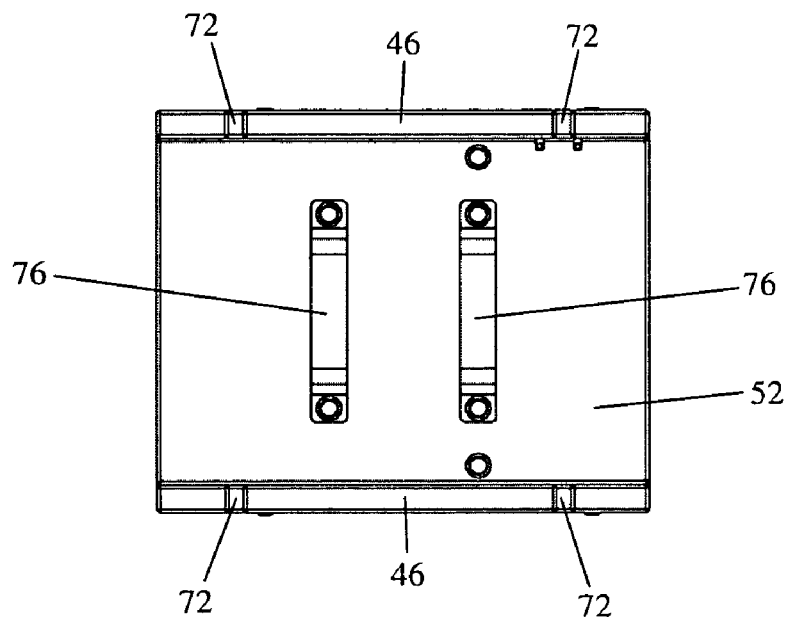
FIG. 3 is a top detail view illustrating a cutting station of the preferred embodiment of the present invention shown in FIG. 1.
Figure 4:
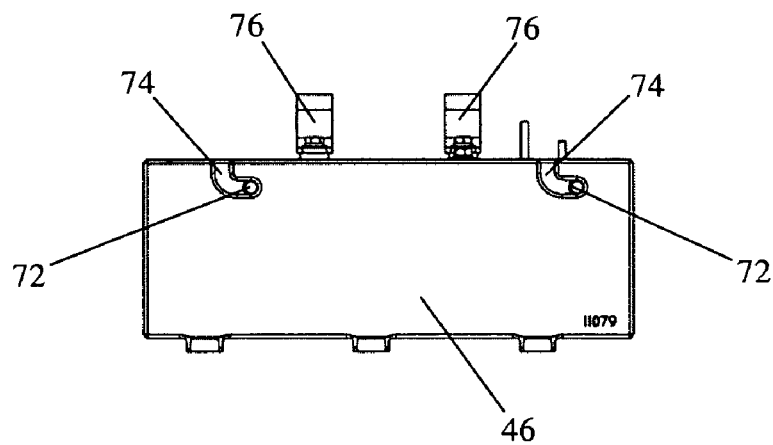
FIG. 4 is a right side detail view illustrating the cutting station of the preferred embodiment of the present invention shown in FIG. 3.

Referring now to FIG. 2, each knife block 48 comprises a knife cartridge 50 and a knife cartridge holder 52. The knife cartridge 50 matingly fits into a recess 53 that is formed in the bottom surface of the cartridge holder 52, which recess is substantially equal in size and shape to the cartridge 50. Conventional removable fasteners 54 extend through vertical mounting holes 56 and 58 formed in the cartridge holder 52 and in the knife cartridge 50 for securely and removably fastening the cartridge 50 to the cartridge holder 52.

The knife cartridge 50 has a pair of parallel through-holes 60 for accepting a pair of rods 62. The knife blades 64 are secured in the slots 66 in parallel spaced relationship across the width of cartridge 50. The rods 62 removably pass through the holes 60 that are aligned with the holes 68 in the knife blades 64 when the knife blades 64 are aligned in the slots 66. The knife blades 64 are fixed at a downwardly inclined angle determined by the shape of the slots 66 and the relative positions of the holes 60. The angle can be, for example, 30 degrees from horizontal.

The rods 62 are held in place by friction and by inserting the upturned portions 67 of the rods 62 into the vertical grooves 70 that are formed in the side of the knife cartridge 50. The knife blades 64 may thus be conveniently released from the knife cartridge 50 by simply withdrawing the rods 62 from the through-holes 60.

Referring to FIGS. 2-5, the cartridge holder 52 has longitudinally-spaced mounting posts 72 extending laterally from both of its sides. Vertically oriented J-channels 74 are formed in each of the side panels 46 and have open top ends for receiving the mounting posts 72 from above. The width of each channel 74 is substantially equal to the diameter of the mounting posts 72 for providing a close-clearance fit between the exterior surfaces of the posts 72 and the surfaces of the side panels 46 that define the channels 74. When the mounting posts 72 are lowered into the channels 74, the contours of the channels 74 guide the posts 72 down and rearward to the closed ends of the channels 74. Vertical movement of the mounting posts 72 is thereby restricted and the knife block is secured against rearward and upward movement. Metal straps 76 are mounted to the top surface of the cartridge holder 52 in any conventional manner, such as by removable fasteners 78, to form hand-grippable handles.

In this manner, the knife block 48 is securely mounted to the side panels 46 in an easily removable fashion for convenient cleaning, repair or replacement. The side panels 46, which are preferably screwed to the beams 25 and 27, remain in place on the beams, even when the knife block 48 is removed. For example, in order to remove the knife block 48 from the side panels 46, a user simply grips the metal straps 76, shifts the knife block forward to move the mounting posts 72 away from the closed ends of the J-channels 74 and into position below the open ends of the channels 74, and lifts the block 48 upwardly to remove the posts 72 from the channels 74. Although it is preferred that the channels 74 be generally J-shaped with a curved contour intermediate a substantially vertical segment and a substantially horizontal segment, it is contemplated that the channels can have any other suitable shape, such as an L-shape, that would require the mounting posts 72 to be inserted vertically and shifted horizontally and that would thereafter restrict the upward and rearward movement of the mounting posts 72. It is contemplated that other fasteners that can be rapidly removed without the need for multiple operations with tools can substitute for the preferred fasteners.

It is contemplated that the mounting posts 72 and J-channels 74 of each cutting station 32 and 34 can be longitudinally staggered so that each knife block 48 will only fit into particular side panels 46 with the corresponding spacing. This tends to assure that when the number and spacing of the knife blades 64 mounted in the knife cartridge 50 of each cutting station 32 and 34 are different from one another, each knife block 48 will only fit into a particular side panel 46 mounted on the frame 20 to provide the selected portion sizes of meat desired. This eliminates or tends to reduce the potential for human error in setting up the apparatus 10 to provide the desired result. When the number and spacing of slots 66 and knife blades 64 are the same in each knife block 48, as shown in the preferred embodiment, this feature is not critical.

It should be pointed out that one of ordinary skill will readily understand from the foregoing description that other conventional means may be employed to provide equivalents to cutting stations 32 and 34 which function in a similar manner to accomplish the primary results of the present invention.

Figure 6:
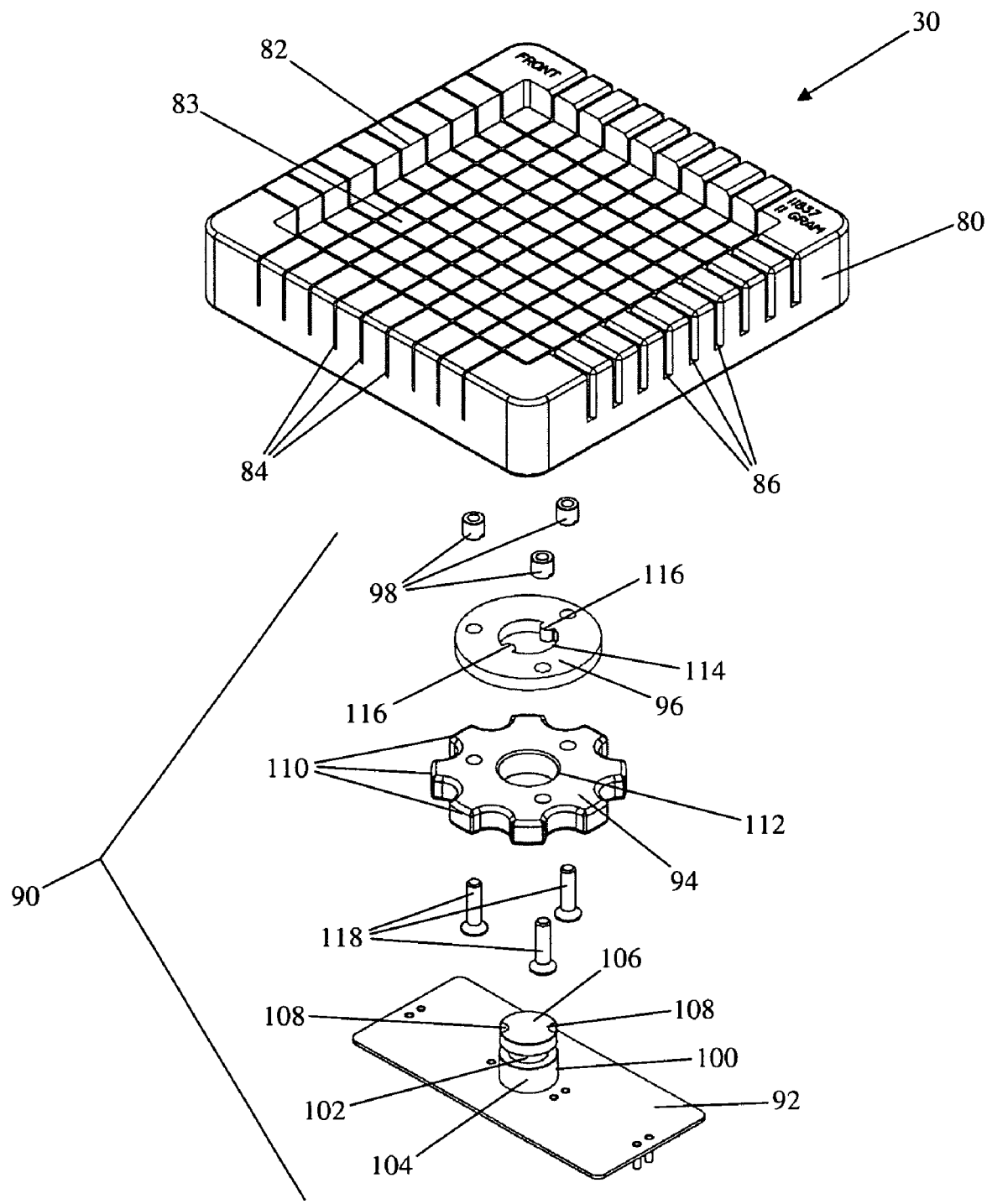
FIG. 6 is an exploded view in perspective illustrating a carrier block and related components of the preferred embodiment of the present invention shown in FIG. 1.

Now referring specifically to FIG. 6, the carrier block 30 and its related components are shown in detail. Preferably, the carrier block 30 comprises a main body portion 80 provided with an upwardly facing or open-top central recess portion 82 and a plurality of intersecting slots, such as shown at 84 and 86. The slots 84 and 86 intersect each other at a selected angle. The typical angle would be approximately ninety degrees to provide a generally rectangular or cube-like portion size. However, the angle of intersection could be varied, if desired, to accommodate other shaped portions as will be apparent from the following description.

It should be noted that testing has indicated that the shape of the recess 82 need not be square or rectangular. However, for generally irregularly shaped initial meat products, such as poultry breasts, a generally square or rectangularly shaped recess works very well and is generally preferred to yield very good results relating to efficiency and consistency of the resulting control of portion size and weight.

As shown in the preferred embodiment herein, there are an equal number of slots 84 and 86 equally spaced from one another. However, it should be noted that the number of slots in the blocks 30 that are oriented in any direction and/or the spacing of the slots may differ from the number and/or spacing of the intersecting slots 66 in the knife block. Thus, a variety of sizes and shapes may be readily chosen for the final meat portion created. Of course, the number of knife blades 64 and their spacing in the knife cartridges 50 would also be changed to accommodate the number of slots 84 and 86 chosen.

Still referring to FIG. 6, each carrier block 30 is provided with a rotation assembly 90 for removably and rotatably mounting the carrier blocks 30 to the chain conveyor 28. The rotation assembly 90 forms part of a turning or rotating actuating means for causing the selective rotation of the carrier block 30. This rotation through a selected angle occurs after passing through the first knife block 32 and before entry into the second knife block 34, and subsequently prior to passing into the first knife block 32 on a repeat run of the cutting cycle.

The rotation assembly 90 includes a pivot plate 92, a rotation gear 94, a locking disc 96 and threaded spacers 98. The pivot plate 92 is removably mounted to the conveyor 28 by any conventional method, such as by mounting the plate to a cross member that is rigidly fastened to the conveyor 28 (not shown). The plate 92 is provided with an upwardly extending, substantially cylindrical pivot post 100. The pivot post 100 has an annular groove 102 that separates the post into a lower shaft segment 104 and an upper head segment 106. Two opposing semi-circular notches 108 are formed in the outer surface of the head segment 106, and extend from the top of the upper head segment 106 to the top of the groove 102.

The rotation gear 94 is a gear of a conventional variety with a plurality of gear teeth 110 and a central aperture 112. The central aperture 112 has a diameter that is substantially equal to the diameter of the pivot post 100. The locking disc 96 is a round, substantially planar body that has a locking aperture 114 that is substantially equal in diameter to the central aperture of the rotation gear. Two semi-circular protrusions 116 extend inwardly from the edges of the locking aperture 114 that correspond in size, shape and relative position to the semi-circular notches 108 in the pivot post 100. The thickness of the locking disc 96 is substantially equal to the width of the annular groove 102 in the pivot post 100, permitting the protrusions 116 to slide within and around the groove 102.

Threaded fasteners, such as the screws 118, extend upwardly through mounting holes in the rotation gear 94 and in the locking disc 96, through the threaded spacers 98, and into threaded bore holes in the bottom of the carrier block 30 (not within view). This is for the purpose of holding the gear 94, disc 96, and spacers 98 in firm engagement with one another and with the carrier block 30 and preventing relative rotation between these components during normal operation. Although threaded fasteners are preferred, all other means for securely holding the described components together are contemplated, such as welding, adhesives or various other types of fasteners. When all of the components are fastened together, the threaded spacers 98 create a gap between the lower face of the carrier block 30 and the upper face of the locking disc 96. The spacers 98 have a length that is substantially equal to the width of the head segment 106 of the pivot post 100, and therefore the gap created by the spacers 98 has a width that is substantially equal to the width of the head segment 106. This is preferred so that the block 30, gear 94 and disc 96 can freely rotate about the post 100 when the protrusions 116 are slidably mounted in the groove 102.

In order to rotatably mount the carrier block 30 to the conveyor 28, the plate 92 is fixed to the conveyor 28, and the rotation gear 94 and the locking disc 96 are lowered onto the attached pivot post 100. The semi-circular protrusions 116 of the disc 96 must be vertically aligned with the semi-circular notches 108 in the head segment 106 of the pivot post 100 to allow the head segment 106 to pass through the central aperture 112 and then the locking aperture 114. When the bottom surface of the carrier block 30 is brought to rest upon the upwardly-facing surface of the head segment 106 of the pivot post 100, the upper and lower faces of the semi-circular protrusions 116 are aligned with the upper and lower surfaces defining the annular groove 102. Simultaneously, the upper and lower faces of the head segment 106 of the post 100 are aligned with the upper and lower edges of the gap between the carrier block 30 and the locking disc 96. The carrier block 30 is thus able to rotate about the pivot post 100 with the semi-circular protrusions 116 of the locking disc 96 traveling within the annular groove 102. As long as the protrusions 116 are not vertically aligned with the notches 108, the carrier block 30 is prevented from lifting off the pivot post 100 by the surfaces defining the annular groove 102. It is therefore desirable to orient the block 30 upon the pivot post 100 in such a manner that the protrusions 116 are kept out of alignment with the notches 108 during operation of the apparatus 10, other than during brief moments while the block 30 is rotating.

The close clearance relationships between the surfaces of the carrier block 30, the locking disc 96 and the pivot post 100 provide the carrier block 30 with a reasonable degree of upright stability without greatly inhibiting the rotation of the block 30. It is generally desirable, however, that some significant degree of force be necessary to cause the carrier block 30 to rotate so that the block is not accidently rotated by forces such as vibration, air resistance or gravity (should the block 30 and/or the pivot post 100 not be level). Resistance to rotation can be adjustable using conventional devices, such as a friction brake.

Figure 7:
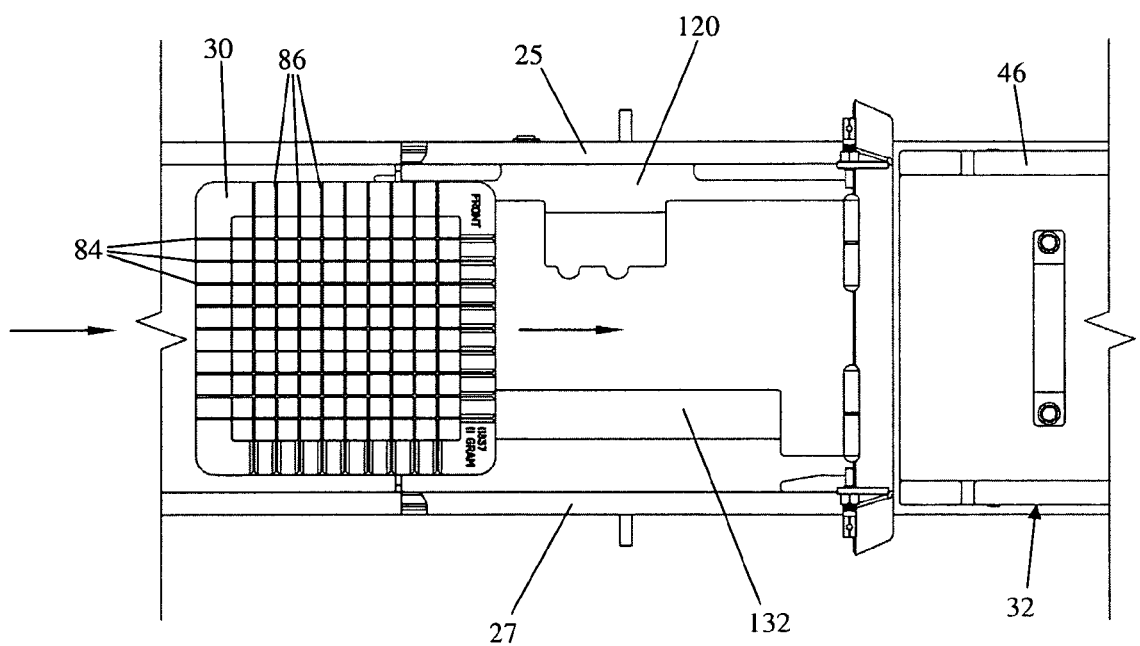
FIG. 7 is a top detail view illustrating a carrier block, rotation bracket and wearstrip of the preferred embodiment of the present invention shown in FIG. 1.
Figure 8:
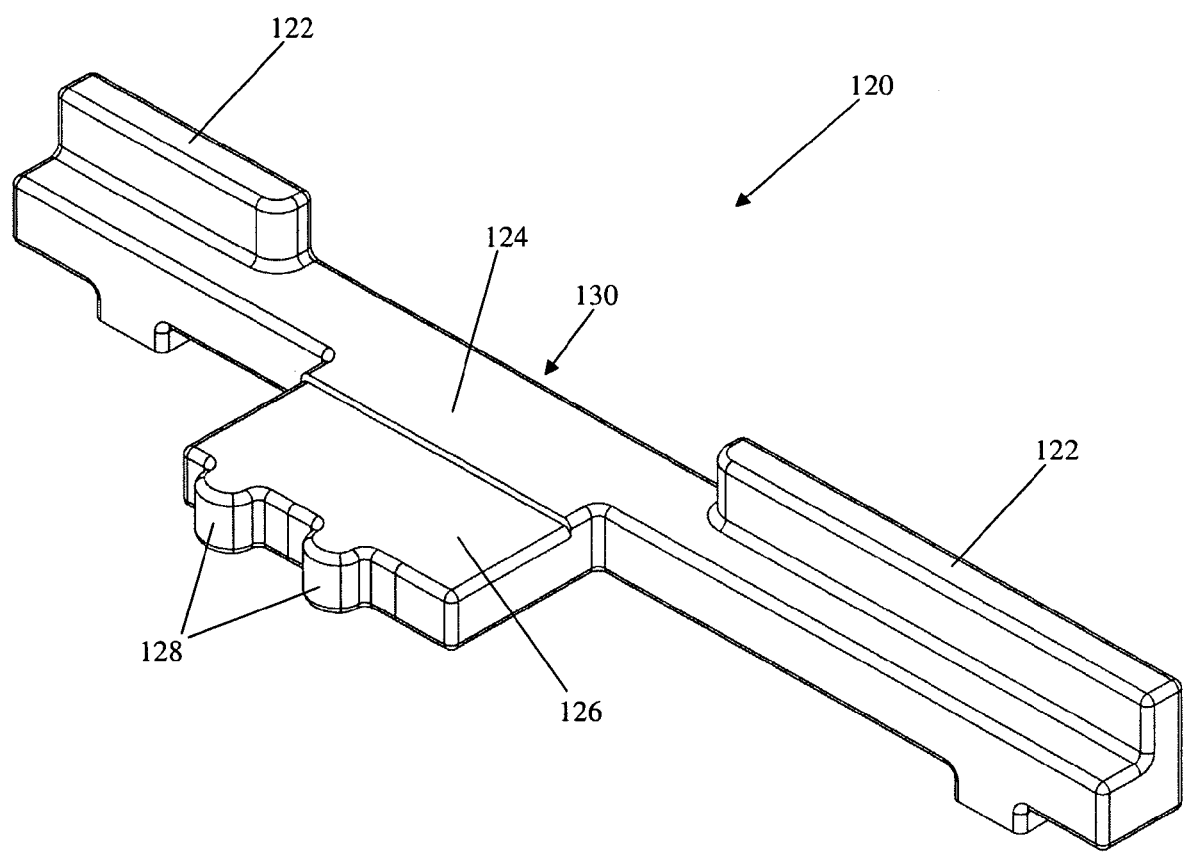
FIG. 8 is a detail view in perspective illustrating a rotation bracket of the preferred embodiment of the present invention shown in FIG. 1.

Referring now to FIG. 7, after the carrier block 30 emerges from the first cutting station 32 (not within view), where the knives extend through at least some of the slots 84, the carrier block 30 engages a rotation bracket 120 that is mounted to the L-shaped beam 25 in a longitudinal orientation intermediate the cutting stations 32 and 34. Referring to FIG. 8, the rotation bracket is a generally L-shaped member, when viewed from the end, having a vertical segment 122 and a horizontal segment 124. A pivot tab 126 extends from the horizontal segment 124 and terminates in a pair of pivot teeth 128 that extend into the path of the gear 94 and are similar in size and shape to the spaces between the teeth 110 of the rotation gear 94 described above. The upper face of the pivot tab 126 is substantially coplanar with the upper face of the rotation gear 94 when the carrier block 30 is mounted on the pivot post 100. Thus, as the chain conveyor 28 moves the carrier block 30 into engagement with the rotation bracket 120, the bottom surface of the block 30 passes over the top surface of the pivot tab 126 and the teeth 110 of the rotation gear 94 engage the space between the pivot teeth 128 as best shown in FIGS. 9a-10b. The engagement between the teeth 110 of the moveable rotation gear 94 and the stationary pivot teeth 128 causes the carrier block 30 to rotate through a selected ninety degree angle to align the intersecting slots 86 parallel with the knife blades 64 in the second cutting station 34.

Figure 9A:
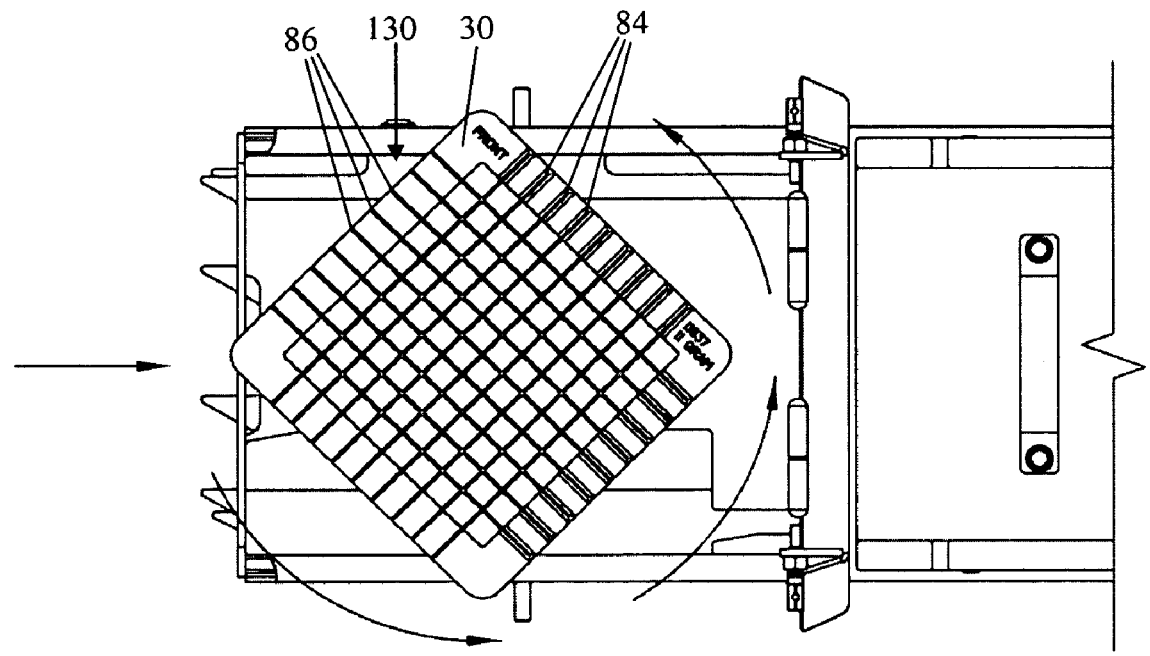
FIG. 9a is a top detail view illustrating a carrier block of the preferred embodiment of the present invention shown in FIG. 1 as it is being rotated.
Figure 9B:
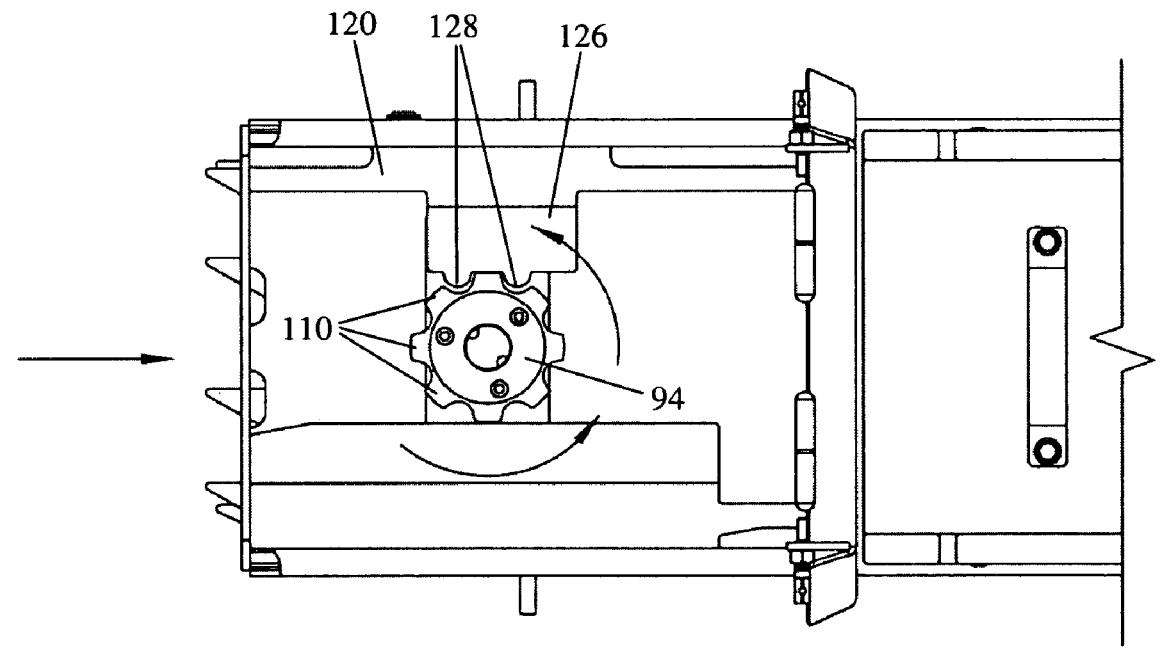
FIG. 9b is the same view shown in FIG. 9a with the carrier block removed to illustrate the rotation gear and the rotation bracket.
Figure 10A:
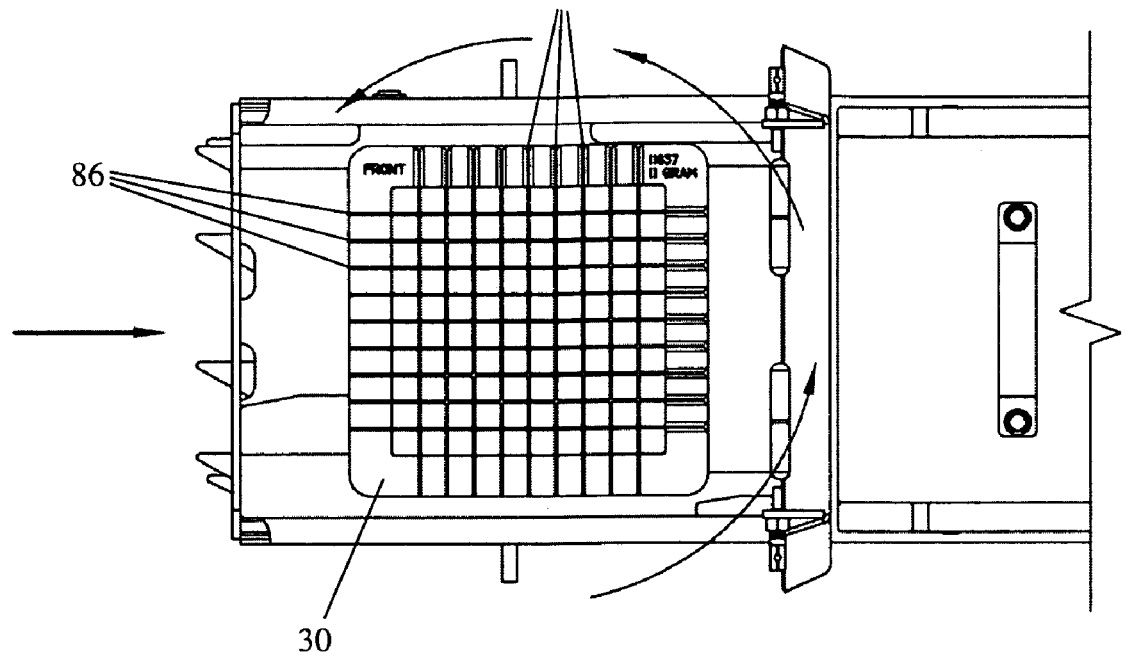
FIG. 10a is a top detail view illustrating the carrier block of the preferred embodiment of the present invention shown in FIG. 1 after it has been rotated.
Figure 10B:
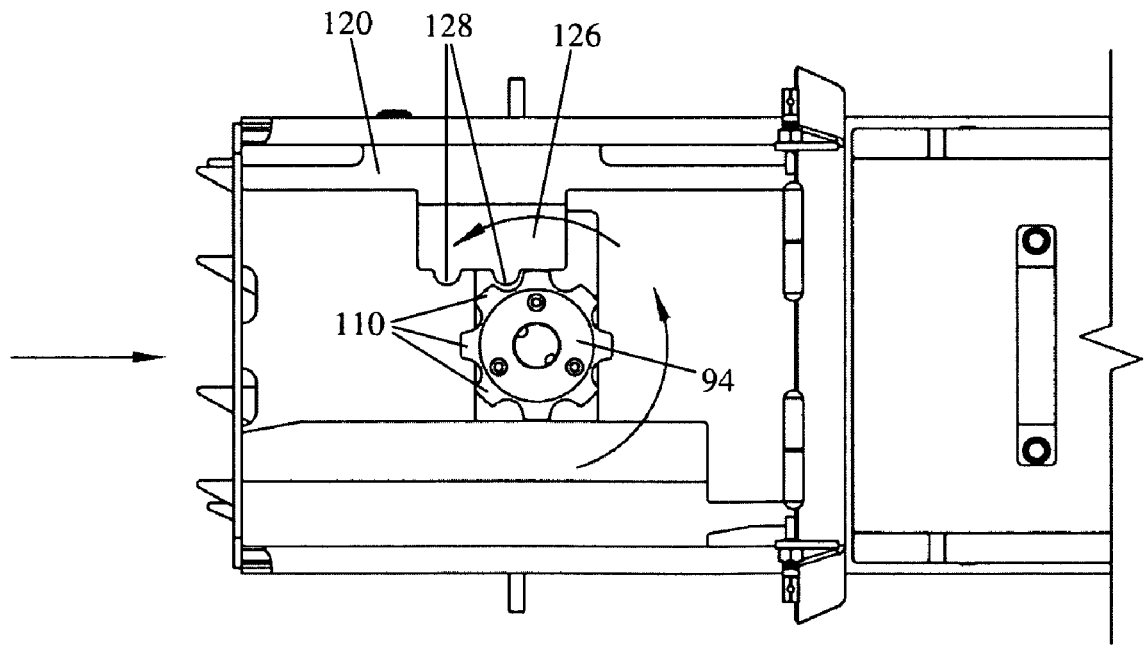
FIG. 10b is the same view shown in FIG. 10a with the carrier block removed to illustrate the rotation gear and the rotation bracket.

Referring back to FIG. 8, the vertical segment 122 of the rotation bracket 120 has a longitudinal gap 130 adjacent the pivot tab 126. The vertical segment 122 is disposed adjacent the edge of the block's 30 laterally-facing edge, and thus provides the carrier block 30 with lateral stability when the block 30 is not being pivoted as shown in FIG. 10a. The gap 130 allows the block 30 to rotate without striking the vertical segment 122 (as illustrated in FIG. 9a) when the block 30 is being rotated.

Figure 11:
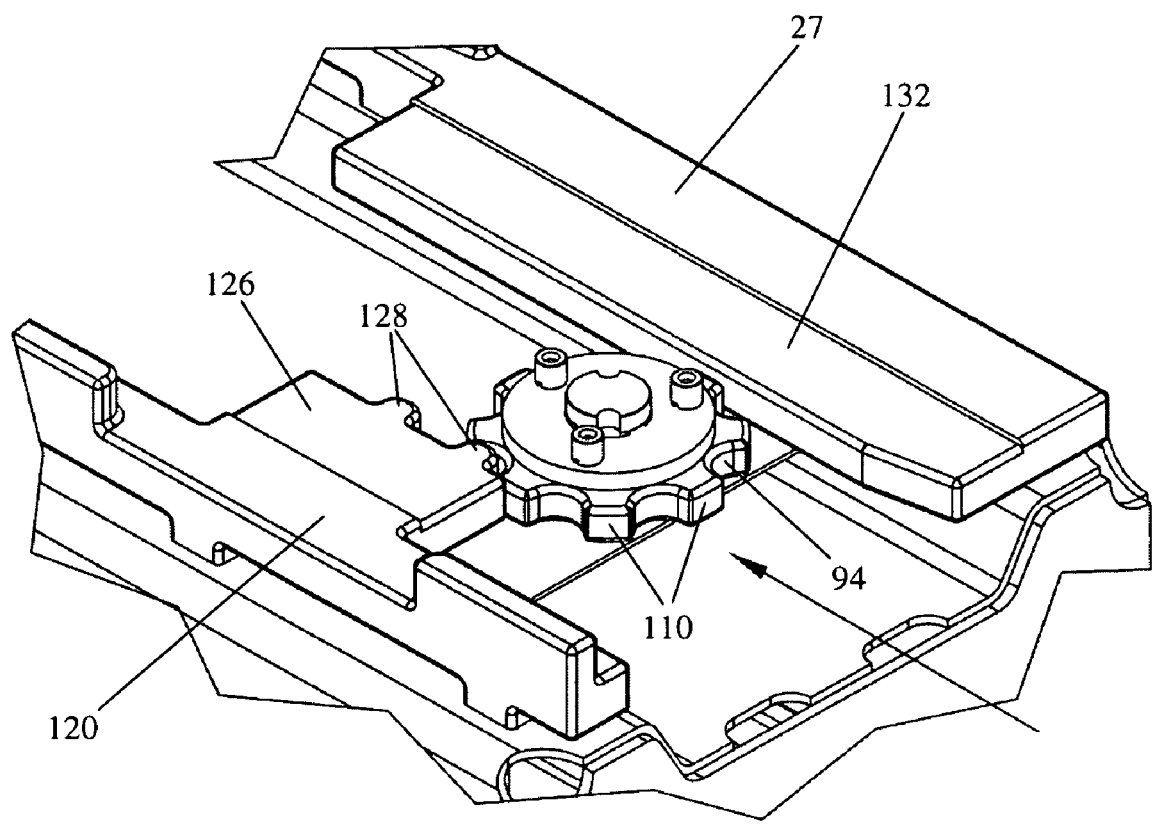
FIG. 11 is a detail view in perspective illustrating the rotation bracket, rotation gear and wearstrip of the preferred embodiment of the present invention shown in FIG. 1.

Referring now to FIGS. 7 and 11, an elongated wearstrip 132 is mounted to the L-shaped beam 27 laterally opposite the rotation bracket 120. The upper face of the wearstrip 132 is substantially co-planar with the upper face of the pivot tab 126. As the carrier block 30 passes along the rotation bracket 120, the bottom surface of the block 30 passes over the top of the wearstrip 132 and the rotation gear 94 passes along the inward-facing surface of the wearstrip 132 in a close-clearance relationship. The top surface of the wearstrip 132 thus provides the carrier block 30 with additional vertical support, and the inward-facing surface of the wearstrip 132 acts as a barrier against lateral movement of the rotation gear 94. The gear 94 is thereby provided with additional lateral support and is prevented from skipping, riding over or otherwise moving laterally away from the pivot teeth 128 of the pivot tab 126 to ensure full engagement between the gear teeth 110 and the pivot teeth 128, and therefore full and proper rotation of the carrier block 30.

By rotating the carrier block 30 at a point between the two cutting stations 32 and 34 in the manner described above, the piece of meat product disposed in the recess 82 of the carrier block 30 is sliced along two paths that are angled ninety degrees from one another to create the size and weight portions desired. This process is described in U.S. Pat. No. 7,364,504, which is incorporated herein by reference. Although the pivot teeth and the teeth of the rotation gear in the preferred embodiment of the invention are configured to rotate the carrier block 30 by an angle of 90 degrees, it is contemplated that the size, shape, and/or spacing of either or both sets of teeth 110 and 128 can be modified to rotate the block 30 more or less than 90 degrees as desired for producing meat portions of different shapes and sizes. If the angle of rotation is varied, the orientation of the intersecting slots 84 and 86 must be modified accordingly.

It is preferred that slots 84 and 86 extend slightly beyond the bottom or floor 83 of the recess 82 and that the extreme tips of the blades do not contact the deepest wall of the slots 84 and 86. This assures a clean and complete cut of the meat product upon entry of the knife blades 64, as described herein, without causing undue wear of the sharp-knife edges which otherwise would engage the floor 83 of the recess 82.

In the preferred embodiment of the invention, a second rotation bracket and second wearstrip (not pictured) are mounted to the L-shaped beams 25 and 27 on the opposite side of the second cutting station 34 relative to the rotation bracket 120 and the wearstrip 132 described above. The second rotation bracket and wearstrip are mounted in an opposite orientation relative to the rotation bracket 120 and wearstrip 132 (i.e., the second rotation bracket is mounted to the L-shaped beam 27 and the second wearstrip is mounted to the L-shaped beam 25) and function to rotate the carrier block 30 back to its position before it engaged the first rotation bracket 120. This ensures that the slots 84 in the carrier block are realigned with the knife blades 64 of the first cutting station 32. For example, if the first rotation bracket were configured to rotate the carrier block 30 by an angle of 60 degrees clockwise, the second rotation bracket would be configured to rotate the block 30 by an angle of 60 degrees counterclockwise. If the first rotation bracket 120 were configured to rotate the carrier block 30 by 90 degrees as in the preferred embodiment, the incorporation of a second rotation block and a second wearstrip is not critical, but can nevertheless carried out.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved automated apparatus for cutting a piece of meat into a plurality of portions of a selected size and shape, the apparatus having at least one carrier block mounted on a conveyor for travel along a selected path and for rotation about a vertical axis relative to said path of travel, the carrier block having a recess with an open top and a selected shape and volume, a plurality of slots in said carrier block intersecting said recess and comprising a first set of laterally spaced slots disposed substantially parallel to the selected path of travel of said carrier block and a second set of slots intersecting said first set of slots at a predetermined angle, a first and second cutting station mounted in longitudinally spaced relationship along said selected path of travel, each cutting station including a channel opening for receiving said carrier block to define a confined volume in cooperation with said recess in said carrier block and a pre-selected plurality of cutting edges mounted in a predetermined laterally spaced relationship to one another and extending parallel to said path of travel of said carrier block, the improvement comprising:
   (a) a rotation gear rigidly mounted to said carrier block and having a plurality of gear teeth;
   (b) at least one rotation bracket mounted at a fixed position along said selected path and having at least two pivot teeth configured to engage said carrier block to selectively rotate between a first position defined by said first set of slots aligned substantially parallel to the path of travel to receive said cutting edges in said first cutting station during passage of said carrier block through the channel in said first cutting station and a second position defined by said second set of slots aligned substantially parallel to the path of travel to receive said cutting edges in said second cutting station during passage of said carrier block through the channel in said second cutting station;
   (c) whereby a meat product disposed in said recess may be cut into a plurality of smaller pieces having a shape and size dependent upon the lateral spacing and angle of intersection of said first and second sets of slots and the number and spacing of said cutting edge.

2. The improved automated apparatus set forth in claim 1, further comprising:
   (a) a locking disc mounted intermediate the carrier block and the rotation gear and spaced apart from the carrier block by at least one spacer to form a gap between the carrier block and the locking disc;
   (b) a locking aperture formed through the locking disc with at least one protrusion of a predetermined shape extending from an edge of the locking aperture;
   (c) a central aperture formed through the rotation gear and aligned with the locking aperture;
   (d) a pivot post extending from the conveyor and having a proximal shaft segment, a distal head segment and an annular groove formed in the pivot post therebetween; and
   (e) at least one notch formed in the head segment of substantially equal size and shape to said at least one protrusion, wherein the pivot post extends through the central aperture and through the locking aperture with the head segment positioned in the gap and said at least one protrusion positioned within the annular groove for allowing the carrier block to rotate about the pivot post and for preventing the carrier block from being removed from the pivot post when said at least one protrusion and said at least one notch are misaligned and for allowing the carrier block to be removed from the pivot post when said at least one protrusion and said at least one notch are aligned.

3. The improved automated apparatus of claim 2, wherein said at least one spacer comprises three spacers that are evenly spaced about the locking disc.

4. The improved automated apparatus of claim 2, wherein said at least one protrusion comprises two radially opposing, semi-circular protrusions and wherein said at least one notch comprises two radially opposing, semi-circular notches having substantially the same size, shape, and relative position as said protrusions.

5. An improved automated apparatus for cutting a piece of meat into a plurality of portions of a selected size and shape, the apparatus having at least one carrier block mounted on a conveyor for travel along a selected path and for rotation about a vertical axis relative to said path of travel, the carrier block having a recess with an open top and a selected shape and volume, a plurality of slots in said carrier block intersecting said recess and comprising a first set of laterally spaced slots disposed substantially parallel to the selected path of travel of said carrier block and a second set of slots intersecting said first set of slots at a predetermined angle, a first and second cutting station mounted in longitudinally spaced relationship along said selected path of travel, each cutting station including a channel opening for receiving said carrier block to define a confined volume in cooperation with said recess in said carrier block, a pre-selected plurality of cutting edges mounted in a predetermined laterally spaced relationship to one another and extending parallel to said path of travel of said carrier block, and means to cause said carrier block to selectively rotate between a first position defined by said first set of slots aligned substantially parallel to the path of travel during passage of said carrier block through said first cutting station and a second position defined by said second set of slots aligned substantially parallel to the path of travel during passage of said carrier block through said second cutting station, whereby a meat product disposed in said recess may be cut into a plurality of smaller pieces having a shape and size dependent upon the lateral spacing and angle of intersection of said first and second sets of slots and the number and spacing of said cutting edges, the improvement comprising:
   said cutting edges removably mounted to knife blocks having laterally extending mounting posts for removably fitting into contoured channels formed adjacent a top of said first and second cutting stations for securing said knife blocks against movement when they are in use and for allowing said knife blocks to be removed from the cutting stations.

6. The improved automated apparatus of claim 5, wherein said countered channels are generally J-shaped for receiving said mounting posts at a first open end and directing said mounting posts to a second closed end for securing said mounting posts against movement during use and for requiring said mounting posts to be shifted in a first general direction and thereafter shifted in a second general direction to be removed from said countered channels.

* * * * *